(12) United States Patent
Hu et al.

(10) Patent No.: US 12,198,385 B2
(45) Date of Patent: Jan. 14, 2025

(54) METHOD AND APPARATUS FOR ADJUSTING AN IMAGE ACQUISITION APPARATUS, COMPENSATION METHOD OF A DISPLAY PANEL, DEVICE AND MEDIUM

(71) Applicant: HEFEI VISIONOX TECHNOLOGY CO., LTD., Anhui (CN)

(72) Inventors: Fengzhang Hu, Hefei (CN); Chenqi Zhang, Hefei (CN); Liangliang Shen, Hefei (CN); Jinquan Zhang, Suzhou (CN); Xinquan Chen, Suzhou (CN); Tao Tang, Hefei (CN)

(73) Assignee: HEFEI VISIONOX TECHNOLOGY CO., LTD., Hefei (CN)

( * ) Notice: Subject to any disclaimer, the term of this patent is extended or adjusted under 35 U.S.C. 154(b) by 0 days.

(21) Appl. No.: 18/240,704

(22) Filed: Aug. 31, 2023

(65) Prior Publication Data
US 2023/0410369 A1 Dec. 21, 2023

Related U.S. Application Data

(63) Continuation-in-part of application No. PCT/CN2022/082475, filed on Mar. 23, 2022.

(30) Foreign Application Priority Data

Jun. 29, 2021 (CN) .......................... 202110729892.9

(51) Int. Cl.
*G06T 7/80* (2017.01)
*G06T 7/00* (2017.01)
*G09G 3/20* (2006.01)

(52) U.S. Cl.
CPC .............. *G06T 7/80* (2017.01); *G06T 7/0004* (2013.01); *G09G 3/2007* (2013.01); *G06T 2207/20216* (2013.01); *G09G 2320/0233* (2013.01)

(58) Field of Classification Search
CPC ..................... G06T 7/80; G06T 7/0004; G06T 2207/20216; G06T 2207/30121;
(Continued)

(56) References Cited

U.S. PATENT DOCUMENTS

2013/0201176 A1* 8/2013 Lee ....................... G06F 1/1647
345/214
2017/0059960 A1* 3/2017 Shi ........................ G06F 3/0346
(Continued)

FOREIGN PATENT DOCUMENTS

CN 101777311 A 7/2010
CN 106023942 A 10/2016
(Continued)

OTHER PUBLICATIONS

International Search Report issued on Jun. 28, 2022, in corresponding International Patent Application No. PCT/CN2022/082475, 6 pages.
(Continued)

*Primary Examiner* — Brent D Castiaux
(74) *Attorney, Agent, or Firm* — Maier & Maier, PLLC

(57) ABSTRACT

A method and apparatus for adjusting an image acquisition apparatus, and a compensation method of a display panel. The method for adjusting an image acquisition apparatus includes the following: the image acquisition apparatus is used to acquire m1 groups of first test image data in a set display region of a display panel displaying in a preset grayscale; a collection parameter of the image acquisition apparatus is determined according to the data deviation distribution of the m1 groups of first test image data; and the determined collection parameter of the image acquisition apparatus is configured into the image acquisition apparatus.

20 Claims, 6 Drawing Sheets

S110 — Use an image acquisition apparatus to acquire m1 groups of first test image data in a set display region of a display panel displaying in a preset grayscale, where m1 is a natural number greater than 2

S120 — Determine a collection parameter of the image acquisition apparatus according to the data deviation distribution of the m1 groups of first test image data S130 — Configure the determined collection parameter of the image acquisition apparatus into the image acquisition apparatus

(58) Field of Classification Search
CPC .......... G06T 5/00; G09G 3/2007; G09G 3/20; G09G 3/2074; G09G 3/006; G09G 2320/0233; G09G 2360/145
See application file for complete search history.

(56) References Cited

U.S. PATENT DOCUMENTS

| | | | | |
|---|---|---|---|---|
| 2018/0033380 | A1* | 2/2018 | An | G06T 7/001 |
| 2019/0266966 | A1 | 8/2019 | Wang | |
| 2020/0349377 | A1* | 11/2020 | Di | G06V 10/242 |

FOREIGN PATENT DOCUMENTS

| | | |
|---|---|---|
| CN | 106448525 A | 2/2017 |
| CN | 107507558 A | 12/2017 |
| CN | 110136212 A | 8/2019 |
| CN | 110176210 A | 8/2019 |
| CN | 108492776 B | 12/2019 |
| CN | 110767164 A | 2/2020 |
| CN | 110796979 A | 2/2020 |
| CN | 110910849 A | 3/2020 |
| CN | 110930954 A | 3/2020 |
| CN | 111028779 A | 4/2020 |
| CN | 111833794 A | 10/2020 |
| CN | 112164374 A | 1/2021 |
| CN | 113380177 A | 9/2021 |
| KR | 20130051751 A | 5/2013 |
| KR | 20140014671 A | 2/2014 |
| WO | 2015109775 A1 | 7/2015 |

OTHER PUBLICATIONS

Office Action issued on Dec. 23, 2021, in corresponding Chinese Patent Application No. 202110129892.9, 11 pages.

* cited by examiner

METHOD AND APPARATUS FOR ADJUSTING AN IMAGE ACQUISITION APPARATUS, COMPENSATION METHOD OF A DISPLAY PANEL, DEVICE AND MEDIUM

CROSS-REFERENCE TO RELATED APPLICATION

This is a continuation-in-part of International Patent Application NO. PCT/CN2022/082475, filed on Mar. 23, 2022, which claims priority to Chinese Patent Application No. 202110729892.9 filed with the China National Intellectual Property Administration (CNIPA) on Jun. 29, 2021, the disclosure of which is incorporated herein by reference in its entirety.

TECHNICAL FIELD

The present disclosure relates to the field of display technology, for example, a method and apparatus for adjusting an image acquisition apparatus, and a compensation method of a display panel.

BACKGROUND

With the development of display technology, requirements for the display effect of display products are increasingly higher. To meet the requirements of a user for display performance, display non-uniformity is usually tested before a display panel leaves the factory. A display product with non-uniform display is compensated according to a compensation method. However, the compensation accuracy of the compensation method is not high.

SUMMARY

The present disclosure provides a method and apparatus for adjusting an image acquisition apparatus, and a compensation method of a display panel so that the image acquisition apparatus has relatively high data collection accuracy. Therefore, when the display panel is compensated according to the display data collected by the image acquisition apparatus, compensation accuracy is relatively high.

The present disclosure provides a method for adjusting an image acquisition apparatus. The method includes the steps below.

The image acquisition apparatus is used to acquire m1 groups of first test image data in a set display region of a display panel displaying in a preset grayscale, where m1 is a natural number greater than 2.

A collection parameter of the image acquisition apparatus is determined according to data deviation distribution of the m1 groups of first test image data.

The determined collection parameter of the image acquisition apparatus is configured into the image acquisition apparatus.

The present disclosure further provides a compensation method of a display panel. The method includes the steps below.

The method for adjusting an image acquisition apparatus according to any embodiment of the present disclosure is used to adjust a collection parameter of the image acquisition apparatus.

The image acquisition apparatus subjected to parameter adjustment is used to collect test image data in a plurality of different preset grayscales.

A compensation value of the display panel is determined according to the test image data in the plurality of different preset grayscales and target brightness.

The present disclosure further provides an electronic device. The electronic device includes at least one processor; and a memory configured to store at least one program, where when the at least one program is executed by the at least one processor, the at least one processor implements the preceding method for adjusting an image acquisition apparatus.

The present disclosure further provides a non-transitory computer-readable storage medium storing a computer program, where the computer program is configured to, when executed by a processor, implement the preceding method for adjusting an image acquisition apparatus.

In the present disclosure, the image acquisition apparatus is used to acquire the m1 groups of first test image data in the set display region of the display panel displaying in the preset grayscale, and the collection parameter of the image acquisition apparatus is determined according to the data deviation distribution of the m1 groups of first test image data. In this case, the data collected by the image acquisition apparatus conforms to the actual error distribution when the collection parameter of the image acquisition apparatus has no deviation. Data reflecting an actual display situation of the set display region can be obtained through subsequent error processing, improving the data collection accuracy of the image acquisition apparatus. Therefore, when the display panel is compensated according to the display data collected by the image acquisition apparatus, compensation accuracy is relatively high.

DETAILED DESCRIPTION

Figure 1:
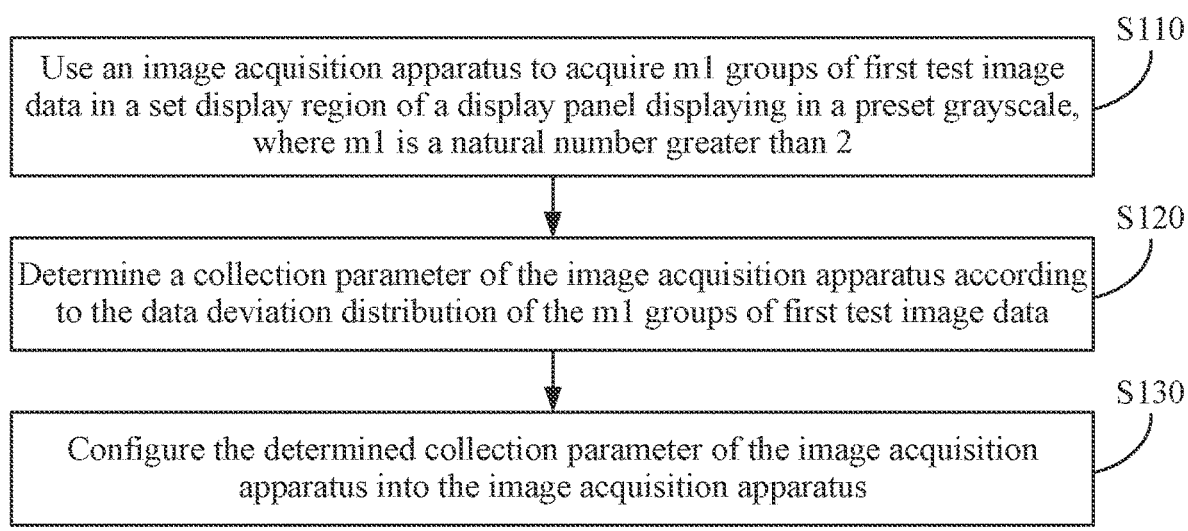
FIG. 1 is a flowchart of a method for adjusting an image acquisition apparatus according to an embodiment of the present disclosure.

The present disclosure is described below in conjunction with drawings and embodiments. Specific embodiments described herein are merely intended to explain the present disclosure. For ease of description, only parts related to the present disclosure are illustrated in the drawings.

As mentioned in the BACKGROUND, a method for compensating for non-uniform display of a display panel does not have high compensation accuracy. The reason for this problem lies in the following: The display panel with a transparent display region has relatively high requirements for brightness consistency between a primary screen and a secondary screen (the transparent region). Through testing, when greater than 2%, the brightness difference between the primary screen and the secondary screen can be clearly perceived by human eyes. Therefore, in the compensation process of non-uniform display of the display panel, requirements for the accuracy of brightness data collected by an image acquisition apparatus are relatively high. However, the collection accuracy of the brightness data of the display panel by the image acquisition apparatus is ±3%, failing to meet accuracy requirements and resulting in low compensation accuracy for the display panel.

Based on the preceding problem, this embodiment provides the solutions below.

This embodiment provides a method for adjusting an image acquisition apparatus. FIG. 1 is a flowchart of a method for adjusting an image acquisition apparatus according to an embodiment of the present disclosure. Referring to FIG. 1, the method includes the steps below.

In S110, an image acquisition apparatus is used to acquire m1 groups of first test image data in a set display region of a display panel displaying in a preset grayscale. m1 is a natural number greater than 2.

The image acquisition apparatus is a device that may collect brightness data, for example, a camera or another brightness collection device. The set display region may be any display region of the display panel. Exemplarily, the set display region may be a secondary screen region of the display panel. The transmittance of the secondary screen region is greater than the transmittance of other display regions of the display panel. The first test image data includes the brightness value of each pixel point in the set display region of the display panel when the preset grayscale is displayed. Exemplarily, the set display region includes n sub-pixels. In this case, each group of first test image data includes brightness values of the n sub-pixels. The image acquisition apparatus may be used for shooting m1 times to obtain the m1 groups of first test image data. The value of m1 may be set according to needs. In order to improve the compensation speed, m1 may be set to be less than or equal to 10. Exemplarily, m1 may be 3 to 10.

In S120, a collection parameter of the image acquisition apparatus is determined according to the data deviation distribution of the m1 groups of first test image data.

The collection parameter may include, for example, aperture size and exposure time. In nature and production, some phenomena are affected by many independent random factors. When the effect generated by each factor is minimal, the total effect may be considered to obey normal distribution. Normal distribution has different distribution patterns depending on the average number of random variables as well as the size and unit of standard deviation. Normal distribution, also known as Gaussian distribution, is a continuous probability distribution of a random variable. Many phenomena in nature and human society conform to a normal distribution. For example, human heights in different regions, student performance, and sensor white noise of a camera all conform to a normal distribution. Therefore, when the collection parameter of the image acquisition apparatus is set reasonably with no collection deviation caused by unreasonable parameter setting, the deviation of the data collected by the image acquisition apparatus conforms to a normal distribution.

The data deviation of the m1 groups of first test image data may be obtained through the following manner a brightness average value of each sub-pixel is calculated according to the m1 groups of first test image data to obtain a brightness average value of the n sub-pixels; then a brightness value of each sub-pixel in each group of test image data is subtracted from a corresponding brightness average value to obtain m1 groups of brightness deviation. The m1 groups of brightness deviation is the data deviation of the m1 groups of first test image data, and the collection parameter of the image acquisition apparatus is adjusted according to the distribution of the data deviation until the data deviation of the m1 groups of test image data collected by the image acquisition apparatus conforms to a normal distribution.

In S130, the determined collection parameter of the image acquisition apparatus is configured into the image acquisition apparatus.

In this embodiment, the image acquisition apparatus is used to acquire the m1 groups of first test image data displaying in the preset grayscale. The collection parameter of the image acquisition apparatus is determined according to the distribution of data deviation of the m1 groups of first test image data, so that the data collected by the image acquisition apparatus conforms to the actual error distribution when the collection parameter of the image acquisition apparatus has no deviation. Data reflecting an actual display situation of the set display region can be obtained through subsequent error processing. In this manner, the data collection accuracy of the image acquisition apparatus is improved. Therefore, when the display panel is compensated according to the display data collected by the image acquisition apparatus, compensation accuracy is relatively high.

Figure 2:
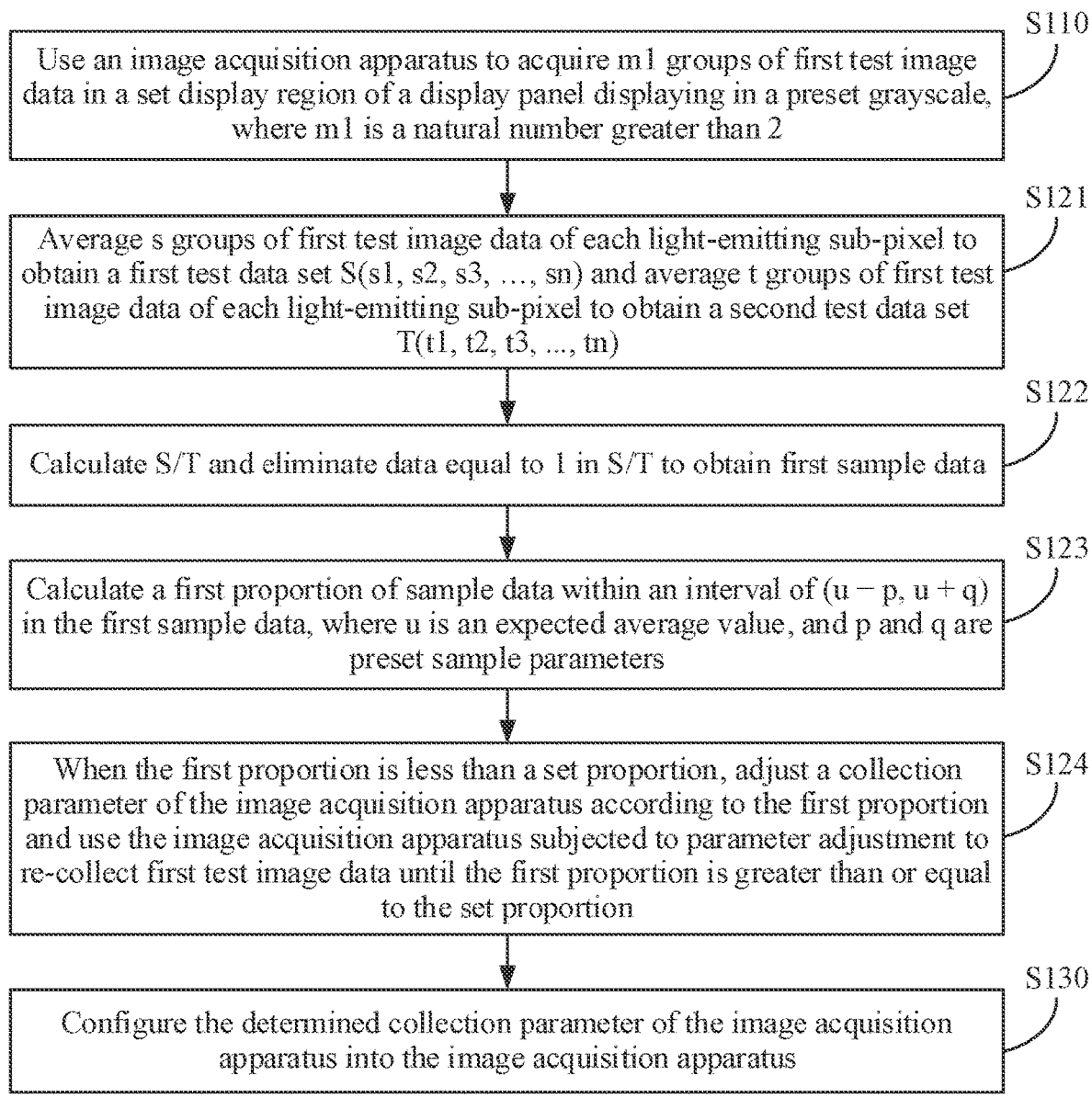
FIG. 2 is a flowchart of another method for adjusting an image acquisition apparatus according to an embodiment of the present disclosure.

FIG. 2 is a flowchart of another method for adjusting an image acquisition apparatus according to an embodiment of the present disclosure. Optionally, referring to FIG. 2, the method includes the steps below.

In S110, the image acquisition apparatus is used to acquire m1 groups of first test image data in a set display region of a display panel displaying in a preset grayscale. m1 is a natural number greater than 2.

In S121, s groups of first test image data of each light-emitting sub-pixel are averaged to obtain a first test data set $S(s_1, s_2, s_3, \ldots, s_n)$, and t groups of first test image data of each light-emitting sub-pixel are averaged to obtain a second test data set $T(t_1, t_2, t_3, \ldots, t_n)$. n is the number of light-emitting sub-pixels in the set display region of the display panel. $s_1, s_2, s_3, \ldots,$ and $s_n$ are average values of s groups of brightness data of n different light-emitting sub-pixels. $t_1, t_2, t_3, \ldots,$ and $t_n$ are average values of t groups of brightness data of the n different light-emitting sub-pixels. $s+t=m_1$.

The display image may be a monochromatic image or may be a grayscale image. When a monochromatic image is displayed, sub-pixels of only one color on the display panel emit light. For example, when a red image is displayed on the display panel, red sub-pixels on the display panel emit light, and sub-pixels of other colors do not emit light. When a grayscale image is displayed on the display panel, all sub-pixels emit light with the same display grayscale.

In the case where a monochromatic image is displayed on the display panel, that the set display region of the display panel displays in the preset grayscale may be that monochromatic sub-pixels on the display panel emit light of preset brightness. The preset brightness is the same as the brightness when a grayscale image of the preset grayscale is displayed through the monochromatic sub-pixels. When a grayscale image is displayed on the display panel, that the set display region of the display panel displays in the preset grayscale may be that a grayscale image of the preset grayscale is displayed through a display image.

When a monochromatic image is displayed on the display panel, one light-emitting sub-pixel is one sub-pixel of the display panel. For example, when a red image is displayed on the display panel, one light-emitting sub-pixel is one red sub-pixel. When a grayscale image is displayed on the display panel (that is, when all sub-pixels emit light with the same display grayscale), one light-emitting sub-pixel may be one sub-pixel of the display panel or may be one pixel unit of the display panel. For example, one pixel unit includes a red sub-pixel, a green sub-pixel, and a blue sub-pixel.

Additionally, the sum of s and t is equal to m1. The s value and the t value may be equal. Taking one light-emitting sub-pixel as an example, the first s groups of first test image data of the light-emitting sub-pixel are s11, s12, s13, ..., and s1s. The subsequent t groups of first test image data of the light-emitting sub-pixel are t11, t12, t13, ..., and t1s. In this case, the average value of the s groups of first test image data is that s1=(s11+s12+s13++s1s)/s. The average value of the t groups of first test image data is that t1=(t11+t12+t13+ ... +t1t)/t. The m1 groups of first test image data may be numbered. Any s groups are selected to obtain the s groups of first test image data. The remaining t groups are taken as the t groups of first test image data. Exemplarily, the first group to the s-th group may be directly selected to obtain the s groups of first test image data.

In S122, S/T is calculated, and data equal to 1 in S/T is eliminated to obtain first sample data.

S/T=(s1/t1, s2/t2, s3/t3, ..., sn/tn). In an ideal state, the accuracy of the image acquisition apparatus is very high with no collection error. In this case, images collected each time need to be the same, that is, s1/t1, s2/t2, s3/t3, ..., and sn/tn are equal to 1. Due to the existence of an image collection error, the images collected each time are slightly different, resulting in that part of s1/t1, s2/t2, s3/t3, ..., and sn/tn are not equal to 1. To prevent the data equal to 1 from affecting error analysis, the data equal to 1 is eliminated, with only the data not equal to 1 left. The first sample data obtained in this case can better reflect the collection error.

In S123, a first proportion of sample data within an interval of (u−p, u+q) in the first sample data is calculated. u is an expected average value. p and q are preset sample parameters.

When a collection parameter of the image acquisition apparatus is set reasonably with no collection deviation caused by unreasonable parameter setting, the first sample data need to conform to a normal distribution generally. u, p, and q can be determined according to the random error distribution of the image acquisition apparatus. Exemplarily, it may be set that u=1 and that p=q=0.1.

In S124, when the first proportion is less than a set proportion, the collection parameter of the image acquisition apparatus is adjusted according to the first proportion, and the data image acquisition apparatus subjected to parameter adjustment is used to re-collect first test image data until the first proportion is greater than or equal to the set proportion.

When collecting an image, the image acquisition apparatus performs line-by-line collection on the display panel. The image is also displayed line by line by the display panel. Due to the effect of the image collection manner and the display manner, when the image acquisition apparatus acquires the image, multiple lateral stripes appear on the display image. For the entire display panel, positions of the lateral stripes are fixed when the lateral stripes change. However, for a set display region with a relatively small area, strips may be located in different positions of the set display region at different moments and may even move out of the set display region. When the collection parameter of the image acquisition apparatus is unreasonable, an image captured by the image acquisition apparatus sometimes has stripes and sometimes has no stripes. Moreover, positions of stripes in different images may be different. Therefore, when the number of captured images is small, the data deviation for each collection is relatively large, and the data does not conform to the set normal distribution. In this case, the first proportion is less than the set proportion. The sample data of the image acquisition apparatus is relatively dispersed.

The image acquisition apparatus subjected to parameter adjustment is used to re-collect m1 groups of first test image data. S, T, and S/T are re-calculated. Each sample value equal to 1 is eliminated according to new S/T to obtain new first sample data. It is continued to determine whether the first proportion of sample data within the interval of (u−p, u+q) in the new first sample data is greater than or equal to the set proportion. After the first proportion is greater than the set proportion, the data collected by the image acquisition apparatus conforms to the actual error distribution of the image acquisition apparatus. The collection parameter in this case is determined as the final collection parameter of the image acquisition apparatus. In this case, the collection parameter of the image acquisition apparatus is relatively reasonable so that the image acquisition device can capture all the error features of the set display region every time it takes a shot, so that images captured by the image acquisition apparatus have good repeatability. Data reflecting an actual display situation of the set display region can be obtained through subsequent error processing. The accuracy of a compensation value obtained according to the display data is relatively high. Exemplarily, the set proportion may be set to be greater than or equal to 60%. Exemplarily, the set proportion may be 70%, 80%, 90%, or 95%.

In S130, the determined collection parameter of the image acquisition apparatus is configured into the image acquisition apparatus.

In this embodiment, the image acquisition apparatus is used to acquire to the m1 groups of first test image data in the display panel displaying in the preset grayscale. The first s groups of first test image data of each light-emitting sub-pixel are averaged to obtain the first test data set S(s1, s2, s3, ..., sn). The subsequent t groups of first test image data of each light-emitting sub-pixel are averaged to obtain the second test data set T(t1, t2, t3, ..., tn). The data equal to 1 in S/T is eliminated to obtain the first sample data. The arrangement of eliminating each value equal to 1 in S/T prevents the data equal to 1 from affecting error analysis so that the obtained first sample data can better reflect the collection error. The first proportion of sample data within the interval of (u−p, u+q) in the first sample data is calculated. When the first proportion is less than the set proportion, the collection parameter of the image acquisition apparatus is adjusted according to the first proportion and the image acquisition apparatus subjected to parameter adjustment is used to re-collect first test image data until the first proportion is greater than or equal to the set proportion. In this case, the image acquisition apparatus has good collection repeatability. The collected data conforms to the actual error distribution of the image acquisition apparatus. Data reflecting an actual display situation of the set display region can be obtained through subsequent error processing. Therefore, the image acquisition apparatus has relatively high data collection accuracy. The accuracy of a compensation value of the display panel obtained according to the display data acquired by the image acquisition apparatus is relatively high. Additionally, only a relatively small number of groups of first test image data need to be collected in this embodiment. The collection parameter of the image acquisition apparatus can be adjusted quickly by performing, for example, a mean operation on the data.

Figure 3:
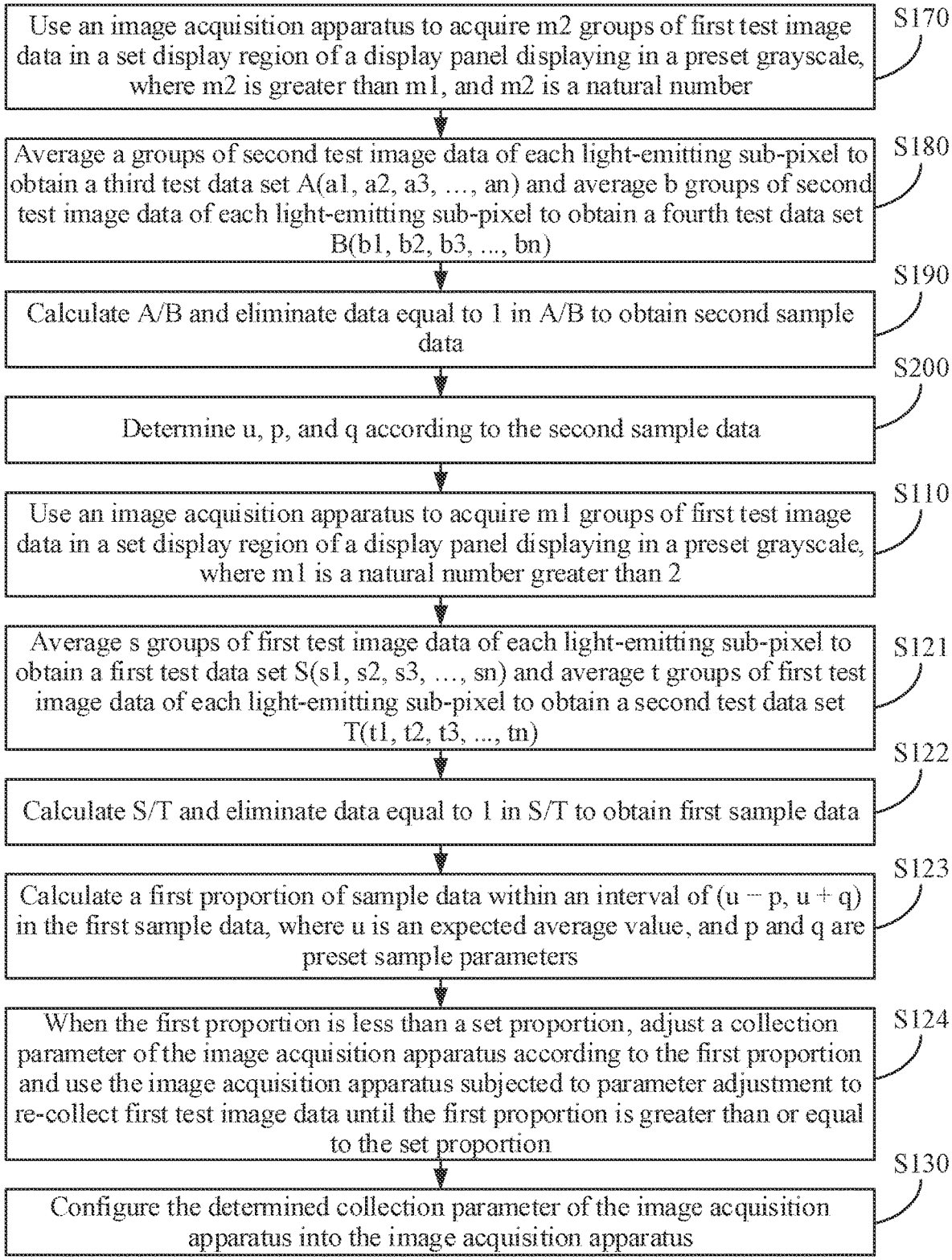
FIG. 3 is a flowchart of another method for adjusting an image acquisition apparatus according to an embodiment of the present disclosure.

FIG. 3 is a flowchart of another method for adjusting an image acquisition apparatus according to an embodiment of the present disclosure. Optionally, referring to FIG. 3, before the image acquisition apparatus is used to acquire m1 groups of first test image data in a set display region of a display panel displaying in a preset grayscale, the method further includes the steps below.

In S170, the image acquisition apparatus is used to acquire m2 groups of second test image data in the set display region of the display panel displaying in the preset grayscale. m2 is greater than m1, and m2 is a natural number.

In S180, a groups of second test image data of each light-emitting sub-pixel are averaged to obtain a third test data set A(a1, a2, a3, . . . , an), and b groups of second test image data of each light-emitting sub-pixel are averaged to obtain a fourth test data set B(b1, b2, b3, . . . , bn). a1, a2, a3, . . . , and an are respectively average values of a groups of brightness data of n different light-emitting sub-pixels. b1, b2, b3, . . . , and bn are respectively average values of b groups of brightness data of the n different light-emitting sub-pixels. a+b=m2.

In S190, A/B is calculated, and data equal to 1 in A/B is eliminated to obtain second sample data.

In S200, u, p, and q are determined according to the second sample data.

m2 in this embodiment is set to a relatively large numerical value. Exemplarily, m2 may be set to an integer greater than or equal to 100. For example, m2 is set to 200, 300, 400, or 500. In this case, the data size of the second test image data is relatively large. Therefore, multiple stripe deviation situations of the set display region can be collected through the second test image data. The second test image data can reflect the error distribution of the actual display data of the set display region of the display panel.

Figure 4:
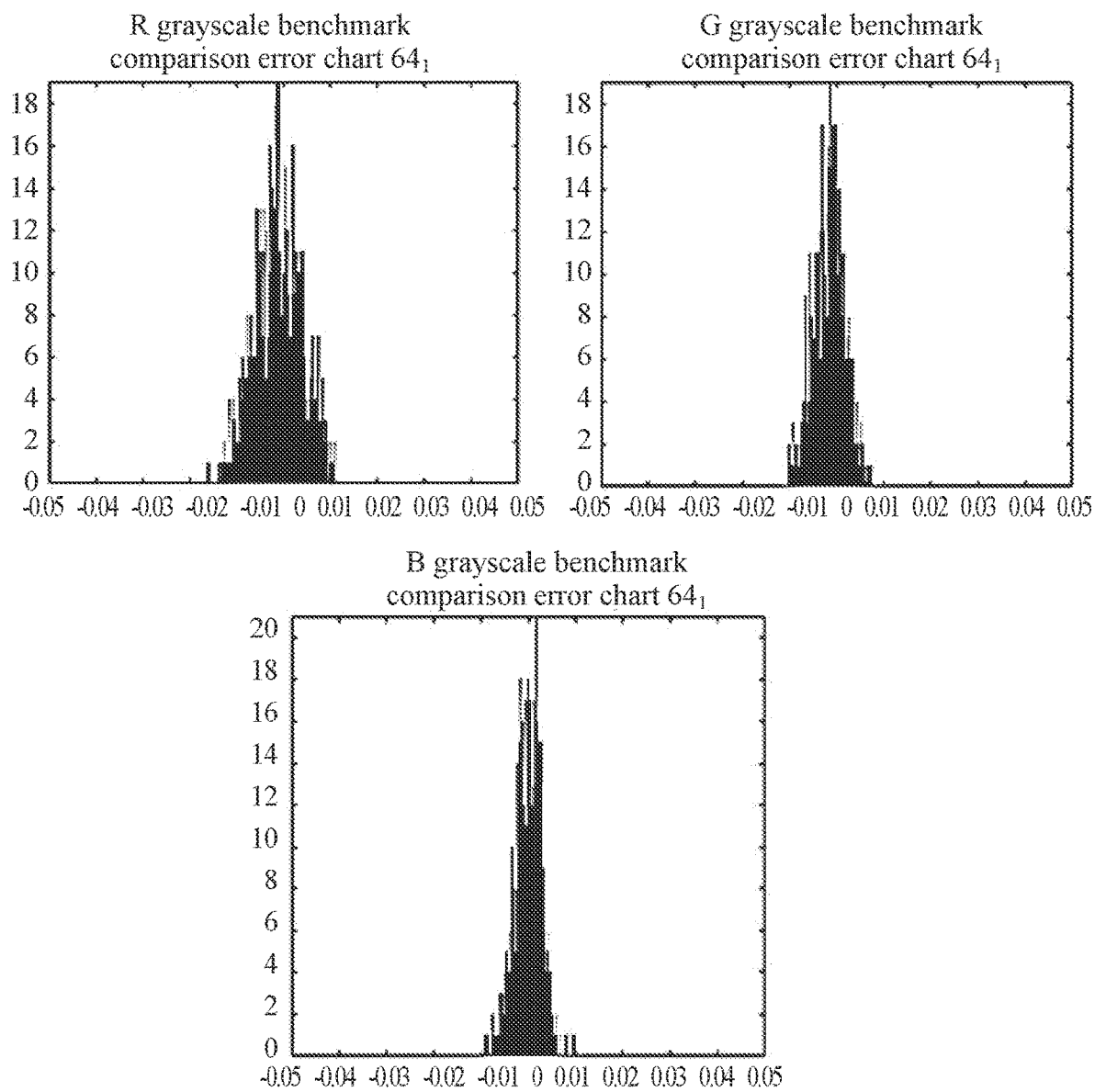
FIG. 4 is a distribution diagram of second sample data of R sub-pixels, G sub-pixels, and B sub-pixels according to an embodiment of the present disclosure.
Figure 5:
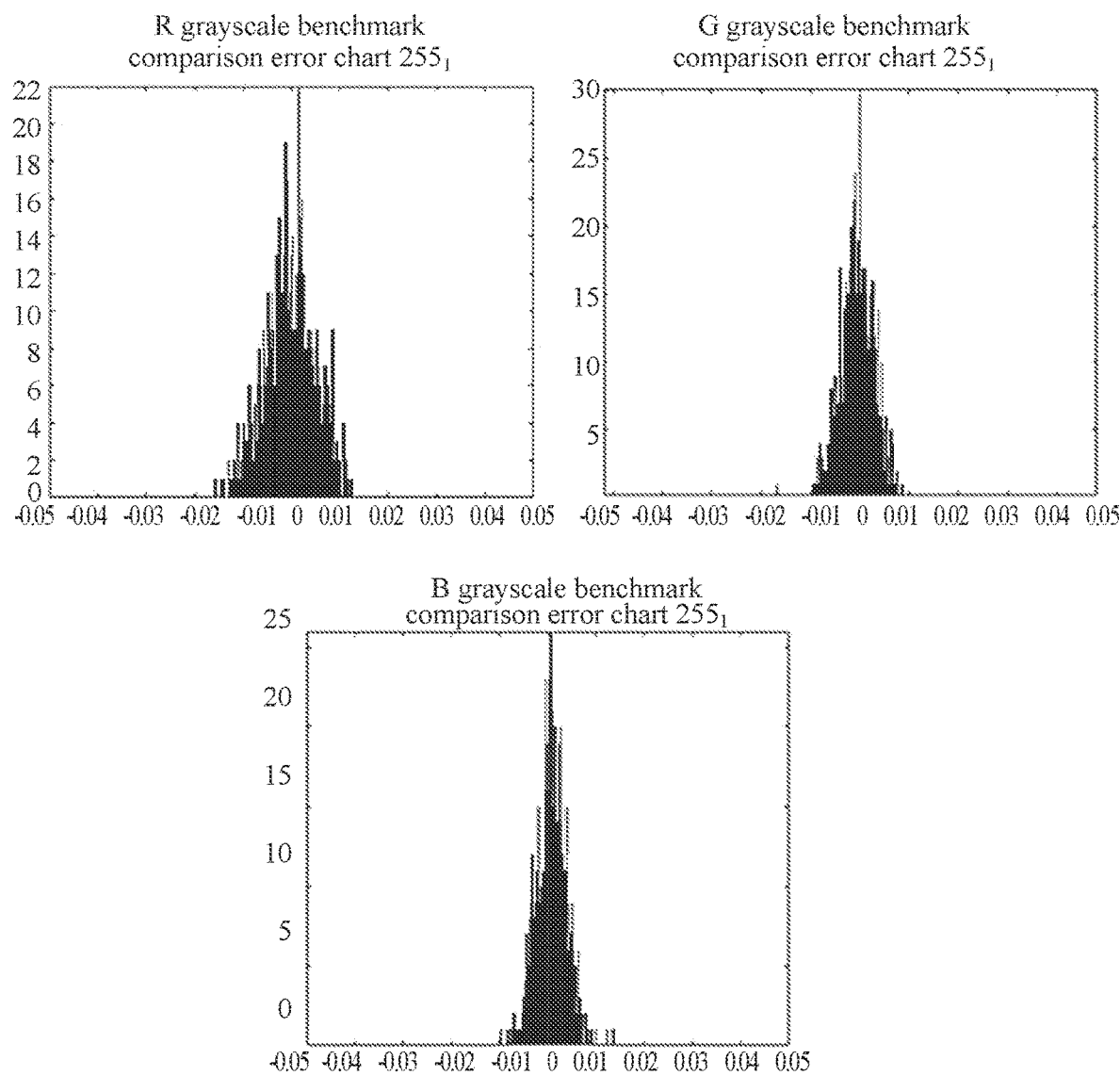
FIG. 5 is another distribution diagram of second sample data of R sub-pixels, G sub-pixels, and B sub-pixels according to an embodiment of the present disclosure.

The data equal to 1 in A/B is eliminated to obtain the second sample data reflecting an actual error situation. The number of each numerical value point in the second sample data is counted to obtain a distribution diagram of the second sample data, with the horizontal axis representing numerical values and the vertical axis representing numbers. FIG. 4 is a distribution diagram of second sample data of R sub-pixels, G sub-pixels, and B sub-pixels according to an embodiment of the present disclosure. FIG. 5 is another distribution diagram of second sample data of R sub-pixels, G sub-pixels, and B sub-pixels according to an embodiment of the present disclosure. Referring to FIGS. 4 and 5, FIG. 4 illustrates the distribution diagram of the second sample data of the R sub-pixels, G sub-pixels, and B sub-pixels of the set display region when the preset grayscale is grayscale 64. FIG. 5 illustrates the distribution diagram of the second sample data of the R sub-pixels, G sub-pixels, and B sub-pixels of the set display region when the preset grayscale is grayscale 255. The average value of samples can be determined according to the distribution diagram of the second sample data. It may be set that u=the average value of samples. (u−p, u+q) may be set as an interval within which a proportion of the data size in the second sample data is the set proportion.

In this embodiment, the m2 groups of second test image data with a large sample size are collected. The first a groups of second test image data of each light-emitting sub-pixel are averaged to obtain the third test data set A(a1, a2, a3, . . . , an). The subsequent b groups of second test image data of each light-emitting sub-pixel are averaged to obtain the fourth test data set B(b1, b2, b3, . . . , bn). Each value equal to 1 in A/B is eliminated to obtain the second sample data. In this case, the second sample data can reflect an actual error situation. Moreover, u, p, and q are determined according to the distribution of the second sample data. The collection parameter of the image acquisition apparatus is adjusted according to u, p, q and the set proportion, so that the distribution form of the first sample data collected by the image acquisition apparatus conforms to the distribution form of the second sample data collected by the image acquisition apparatus. In this case, the collection parameter of the image acquisition apparatus is relatively reasonable so that the image acquisition device can capture all the error features of the set display region every time it takes a shot. Accordingly, images captured by the image acquisition apparatus each time have good repeatability. Data reflecting an actual display situation of the set display region can be obtained through subsequent error processing, further improving the data collection accuracy of the image acquisition apparatus. The accuracy of a compensation value of the display panel obtained according to the display data acquired by the image acquisition apparatus is relatively high.

Optionally, the adjustment method further includes the steps below.

m1 groups of first test image data of each light-emitting sub-pixel are averaged to obtain a fifth test data set E(e1, e2, e3, . . . en). e1, e2, e3, . . . , and en are respectively average values of m1 groups of brightness data of the n different light-emitting sub-pixels. S/E and T/E are calculated; and data equal to 1 in S/T, S/E, and T/E is eliminated to obtain the first sample data.

The data equal to 1 in S/T, S/E, and T/E is eliminated so that the obtained first sample data can better reflect a collection error. Therefore, parameter adjustment is more accurate when a collection parameter of the image acquisition apparatus is adjusted according to the first sample data.

Optionally, the adjustment method further includes the steps below.

m2 groups of second test image data of each light-emitting sub-pixel are averaged to obtain a sixth test data set C(c1, c2, c3, . . . cn). c1, c2, c3, . . . , and cn are respectively average values of m2 groups of brightness data of the n different light-emitting sub-pixels. A/C and B/C are calculated; and data equal to 1 in A/B, A/C and B/C is eliminated to obtain the second sample data.

The data equal to 1 in A/B, A/C and B/C is eliminated so that the obtained second sample data can better reflect an image collection error of the image acquisition apparatus.

Optionally, the step in which the image acquisition apparatus is used to acquire the m1 groups of first test image data in the set display region of the display panel displaying in the preset grayscale includes the step below.

The image acquisition apparatus is used to acquire m1 groups of first test image data in a secondary screen region of the display panel displaying in the preset grayscale. The display panel includes a primary screen region and the secondary screen region. The pixel density of the secondary screen region is less than the pixel density of the primary screen region.

The secondary screen region is a transparent display region of the display panel and is configured to dispose an optical sensor such as a camera. The pixel density of the secondary screen region is less than the pixel density of the primary screen region. In the same display grayscale, for sub-pixels of the same color, the brightness of sub-pixels of the secondary screen region is greater than the brightness of sub-pixels of the primary screen region. Therefore, when the display panel is compensated, data collection and compensation value calculation need to be performed for the secondary screen region and the secondary screen region separately. However, the secondary screen region has a relatively small area. When an image is collected using the image acquisition apparatus, relatively large collection deviation easily occur. With the adoption of solutions in this embodiment to adjust the collection parameter of the image acquisition apparatus, the test image data of the secondary screen region is collected by the image acquisition apparatus subjected to parameter adjustment so that the image acquisition device can capture all the error features of the secondary screen region every time it takes a shot. Data reflecting an actual display situation of the secondary screen region can be obtained through subsequent error processing. The accuracy of a compensation value obtained according to the display data is relatively high.

Figure 6:
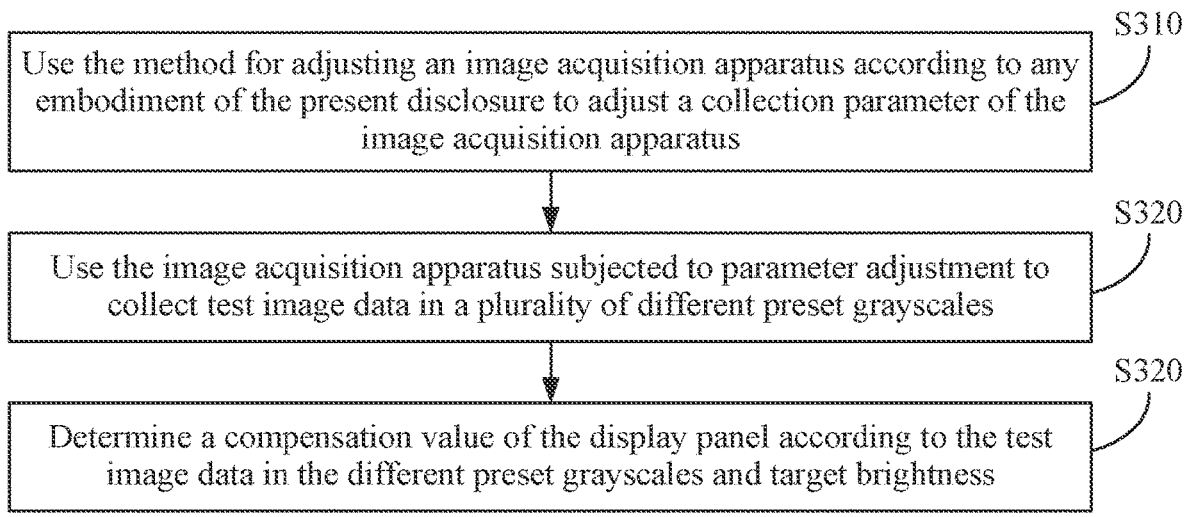
FIG. 6 is a flowchart of a compensation method of a display panel according to an embodiment of the present disclosure.

This embodiment further provides a compensation method of a display panel. FIG. 6 is a flowchart of a compensation method of a display panel according to an embodiment of the present disclosure. Referring to FIG. 6, the method includes the steps below.

In S310, a collection parameter of the image acquisition apparatus is adjusted by the method for adjusting an image acquisition apparatus according to any embodiment of the present disclosure.

In S320, test image data in a plurality of different preset grayscales are collected by the image acquisition apparatus subjected to parameter adjustment.

In S330, a compensation value of the display panel is determined according to the test image data in the different preset grayscales and target brightness.

The test image data in the different preset grayscales includes brightness values of all sub-pixels of a region to be compensated in the display panel. The test image data in the different preset grayscales are collected by the image acquisition apparatus subjected to parameter adjustment. The actual display brightness data of the set display region can be obtained by performing certain processing on the test image data. The compensation value of each sub-pixel can be determined according to the actual display brightness data and the target brightness.

Exemplarily, f groups of test image data may be collected by the image acquisition apparatus subjected to parameter adjustment. f is less than m1. Then, the average value of the f groups of test image data is obtained. The compensation value of each sub-pixel of the display panel is obtained according to the average value and the target brightness. f may be, for example, 2 or 3.

Figure 7:
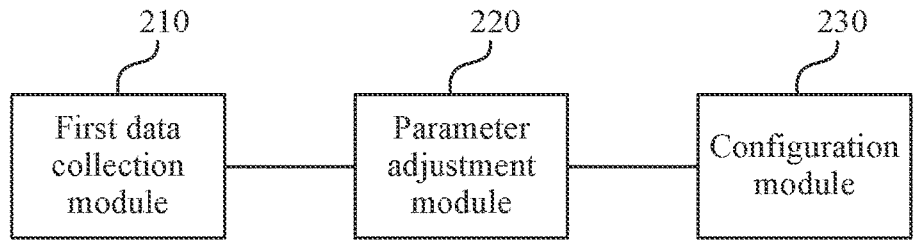
FIG. 7 is a diagram of an apparatus for adjusting an image acquisition apparatus according to an embodiment of the present disclosure.

This embodiment provides an apparatus for adjusting an image acquisition apparatus. FIG. 7 is a diagram of an apparatus for adjusting an image acquisition apparatus according to an embodiment of the present disclosure. Referring to FIG. 7, the apparatus includes a first data collection module 210, a parameter adjustment module 220, and a configuration module 230.

The first data collection module 210 is configured to use an image acquisition apparatus to acquire m1 groups of first test image data in a set display region of a display panel displaying in a preset grayscale. m1 is a natural number greater than 2. The parameter adjustment module 220 is configured to determine a collection parameter of the image acquisition apparatus according to the data deviation distribution of the m1 groups of first test image data. The configuration module 230 is configured to configure the determined collection parameter of the image acquisition apparatus into the image acquisition apparatus.

Optionally, the parameter adjustment module 220 includes an average value calculation unit, a data elimination unit, a proportion calculation unit, and a parameter determination unit.

The average value calculation unit is configured to average s groups of first test image data of each light-emitting sub-pixel of the display panel to obtain a first test data set S (s1, s2, s3, . . . , sn) and average t groups of first test image data of each light-emitting sub-pixel to obtain a second test data set T(t1, t2, t3, . . . , tn). n is the number of light-emitting sub-pixels in the set display region of the display panel. s1, s2, s3, . . . , and sn are average values of s groups of brightness data of n different light-emitting sub-pixels respectively. t1, t2, t3, . . . , and tn are average values of t groups of brightness data of the n different light-emitting sub-pixels respectively. s+t=m1. The data elimination unit is configured to calculate S/T and eliminate data equal to 1 in S/T to obtain first sample data. The proportion calculation unit is configured to calculate a first proportion of sample data within an interval of (u−p, u+q) in the first sample data. u is an expected average value. p and q are preset sample parameters. The parameter adjustment unit is configured to, when the first proportion is less than a set proportion, adjust the collection parameter of the image acquisition apparatus according to the first proportion and use the image acquisition apparatus subjected to parameter adjustment to re-collect first test image data until the re-calculated first proportion is greater than or equal to the set proportion.

Optionally, the apparatus further includes a second data collection module, an average value module, an elimination module, and a numerical value determination module.

The second data collection module is configured to, before the image acquisition apparatus is used to acquire the m1 groups of first test image data in the set display region of the display panel displaying in the preset grayscale, use the image acquisition apparatus to acquire m2 groups of second test image data in the set display region of the display panel displaying in the preset grayscale. m2 is greater than m1. m2 is a natural number. The average value module is configured to average a groups of second test image data of each light-emitting sub-pixel to obtain a third test data set A(a1, a2, a3, . . . , an) and average b groups of second test image data of each light-emitting sub-pixel to obtain a fourth test data set B(b1, b2, b3, bn). a1, a2, a3, . . . , and an are average values of a groups of brightness data of the n different light-emitting sub-pixels respectively. b1, b2, b3, . . . , and bn are average values of b groups of brightness data of the n different light-emitting sub-pixels respectively. a+b=m2. The elimination module is configured to calculate A/B and eliminate data equal to 1 in A/B to obtain second sample data. The numerical value determination module is configured to determine u, p, and q according to the second sample data.

Optionally, the average value calculation unit is further configured to average m1 groups of first test image data of each light-emitting sub-pixel to obtain a fifth test data set E(e1, e2, e3, . . . en). e1, e2, e3, . . . , and en are average values of m1 groups of brightness data of the n different light-emitting sub-pixels respectively. The data elimination unit is further configured to calculate S/E and T/E and eliminate data equal to 1 in S/T, S/E, and T/E to obtain the first sample data.

Optionally, the average value module is further configured to average m2 groups of second test image data of each light-emitting sub-pixel to obtain a sixth test data set C(c1, c2, c3, cn). c1, c2, c3, . . . , and cn are average values of m2 groups of brightness data of the n different light-emitting sub-pixels respectively. The elimination module is further configured to calculate A/C and B/C and eliminate data equal to 1 in A/B, A/C and B/C to obtain the second sample data.

Optionally, the first data collection module 210 is configured to use the image acquisition apparatus to acquire the m1 groups of first test image data in a secondary screen region of the display panel displaying in the preset grayscale. The display panel includes a primary screen region and the secondary screen region. The pixel density of the secondary screen region is less than the pixel density of the primary screen region. Alternatively, the secondary screen region is a transparent display region.

Optionally, m1 is less than or equal to 10. m2 is greater than or equal to 100.

The apparatus for adjusting an image acquisition apparatus according to this embodiment and the method for adjusting an image acquisition apparatus according to any embodiment of the present disclosure belong to the same inventive concept and have the same effects. For technical details not described in detail in this embodiment, reference may be made to the method for adjusting an image acquisition apparatus according to any embodiment of the present disclosure.

Figure 8:
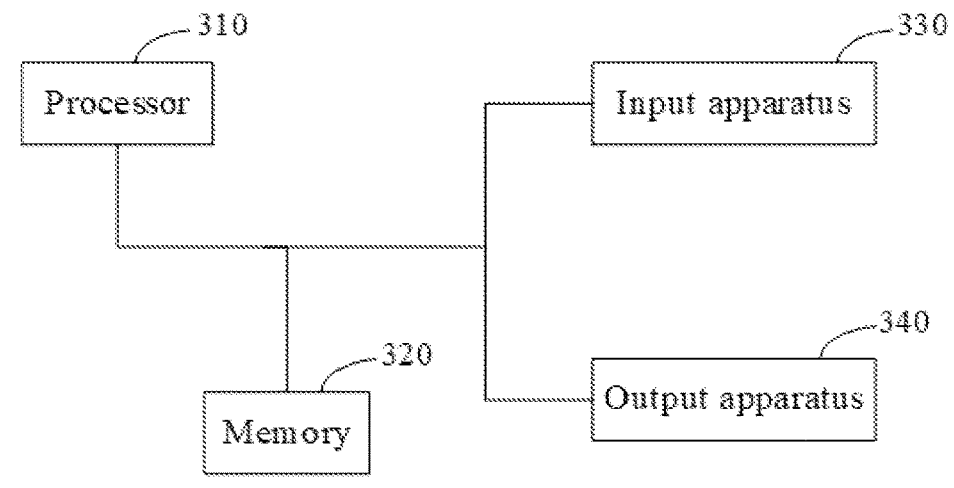
FIG. 8 is a structure diagram of an electronic device according to an embodiment of the present disclosure.

FIG. 8 is a structure diagram of an electronic device according to an embodiment of the present disclosure. As shown in FIG. 8, the electronic device includes one or more processors 310 and a memory 320. FIG. 8 shows one processor 310 by way of example.

The electronic device may further include an input apparatus 330 and an output apparatus 340.

The processor 310, the memory 320, the input apparatus 330, and the output apparatus 340 that are in the electronic device may be connected through a bus or in other manners. FIG. 8 illustrates an example of the connection through a bus.

As a non-transitory computer-readable storage medium, the memory 320 may be configured to store software programs, computer-executable programs, and modules. The processor 310 runs the software programs, instructions and modules stored in the memory 320 to execute multiple function applications and data processing so as to perform the method for adjusting an image acquisition apparatus in the preceding embodiments.

The memory 320 may include a program storage region and a data storage region. The program storage region may store an operating system and an application program required by at least one function. The data storage region may store the data created according to the use of the electronic device. Additionally, the memory may include a volatile memory, for example, a random access memory (RAM), and may also include a non-volatile memory, for example, at least one magnetic disk memory element, a flash memory element, or another non-volatile solid-state memory element.

The memory 320 may be a non-transitory computer-readable storage medium. The non-transitory computer-readable storage medium includes, for example, at least one magnetic disk memory, a flash memory, or another non-volatile solid-state memory. In some embodiments, the memory 320 optionally includes memories which are disposed remotely relative to the processor 310. These remote memories may be connected to the electronic device via a network. The examples of the preceding network may include the Internet, an intranet, a local area network, a mobile communication network, and a combination thereof.

The input apparatus 330 may be configured to receive the input digital or character information and generate key signal input related to user settings and function control of the electronic device. The output apparatus 340 may include a display device such as a display screen.

This embodiment further provides a computer-readable storage medium storing computer programs for executing the preceding methods.

All or part of the processes in the method of the preceding embodiments may be implemented by related hardware executed by computer programs, these programs may be stored in a non-transitory computer-readable storage medium, and during the execution of these programs, the processes in the preceding method may be included. The non-transitory computer-readable storage medium may be a magnetic disk, an optical disk, a read-only memory (ROM), or an RAM.

What is claimed is:

1. A method for adjusting an image acquisition apparatus, comprising:
   using the image acquisition apparatus to acquire m1 groups of first test image data in a set display region of a display panel displaying in a preset grayscale, wherein m1 is a natural number greater than 2;
   determining a collection parameter of the image acquisition apparatus according to data deviation distribution of the m1 groups of first test image data; and
   configuring the determined collection parameter of the image acquisition apparatus into the image acquisition apparatus.

2. The method according to claim 1, wherein determining the collection parameter of the image acquisition apparatus according to the data deviation distribution of the m1 groups of first test image data comprises:
   averaging s groups of first test image data of each light-emitting sub-pixel of the display panel to obtain a first test data set S, wherein the first test data set S comprises n elements which are s1 to sn, and averaging t groups of first test image data of each light-emitting sub-pixel to obtain a second test data set T, wherein the second test data set T comprises n elements which are t1 to tn, wherein n is a number of light-emitting sub-pixels in the set display region of the display panel; s1 to sn are average values of s groups of brightness data of n different light-emitting sub-pixels respectively; t1 to tn are average values of t groups of brightness data of the n different light-emitting sub-pixels respectively; and s+t=m1;
   calculating S/T, and eliminating data equal to 1 in S/T to obtain first sample data;
   calculating a first proportion of sample data within an interval from u−p to u+q in the first sample data, wherein u is an expected average value, and p and q are preset sample parameters; and
   in a case where the first proportion is less than a set proportion, adjusting the collection parameter of the image acquisition apparatus according to the first proportion and using the image acquisition apparatus subjected to parameter adjustment to re-collect first test image data until the re-calculated first proportion is greater than or equal to the set proportion.

3. The method according to claim 2, wherein before the image acquisition apparatus is used to acquire the m1 groups of first test image data in the set display region of the display panel displaying in the preset grayscale, the method further comprises:

using the image acquisition apparatus to acquire m2 groups of first test image data in the set display region of the display panel displaying in the preset grayscale, wherein m2 is greater than m1, and m2 is a natural number;

averaging a groups of second test image data of each light-emitting sub-pixel to obtain a third test data set A, wherein the third test data set A comprises n elements which are a1 to an, and averaging b groups of second test image data of each light-emitting sub-pixel to obtain a fourth test data set B, wherein the fourth test data set B comprises n elements which are b1 to bn, wherein a1 to an are average values of a groups of brightness data of the n different light-emitting sub-pixels respectively; b1 to bn are average values of b groups of brightness data of the n different light-emitting sub-pixels; and a+b=m2;

calculating A/B, and eliminating data equal to 1 in A/B to obtain second sample data; and determining u, p, and q according to the second sample data.

4. The method according to claim 3, further comprising:

averaging m1 groups of first test image data of each light-emitting sub-pixel to obtain a fifth test data set E, wherein the fifth test data set E comprises n elements which are e1 to en, wherein e1 to en are average values of m1 groups of brightness data of the n different light-emitting sub-pixels respectively; and calculating S/E and T/E, and supplementing data obtained by eliminating data equal to 1 in S/E and T/E to the first sample data.

5. The method according to claim 3, further comprising:

averaging m2 groups of second test image data of each light-emitting sub-pixel to obtain a sixth test data set C, wherein the sixth test data set C comprises n elements which are c1 to cn, wherein c1 to cn are average values of m2 groups of brightness data of the n different light-emitting sub-pixels respectively; and calculating A/C and B/C, and supplementing data obtained by eliminating data equal to 1 in A/C and B/C to the second sample data.

6. The method according to claim 1, wherein using the image acquisition apparatus to acquire the m1 groups of first test image data in the set display region of the display panel displaying in the preset grayscale comprises:

using the image acquisition apparatus to acquire m1 groups of first test image data in a secondary screen region of the display panel displaying in the preset grayscale, wherein the display panel comprises a primary screen region and the secondary screen region.

7. The method according to claim 6, wherein a pixel density of the secondary screen region is less than a pixel density of the primary screen region.

8. The method according to claim 6, wherein the secondary screen region is a transparent display region.

9. The method according to claim 3, wherein m1 is less than or equal to 10, and m2 is greater than or equal to 100.

10. An electronic device, comprising:
at least one processor; and
a memory configured to store at least one program, wherein when the at least one program is executed by the at least one processor, the at least one processor implements the method according to claim 1.

11. A computer-readable storage medium storing a computer program, wherein the computer program is configured to, when executed by a processor, implement the method according to claim 1.

12. The electronic device according to claim 10, wherein determining the collection parameter of the image acquisition apparatus according to the data deviation distribution of the m1 groups of first test image data comprises:

averaging s groups of first test image data of each light-emitting sub-pixel of the display panel to obtain a first test data set S, wherein the first test data set S comprises n elements which are s1 to sn, and averaging t groups of first test image data of each light-emitting sub-pixel to obtain a second test data set T, wherein the second test data set T comprises n elements which are t1 to tn, wherein n is a number of light-emitting sub-pixels in the set display region of the display panel;

s1 to sn are average values of s groups of brightness data of n different light-emitting sub-pixels respectively; t1 to tn are average values of t groups of brightness data of the n different light-emitting sub-pixels respectively; and s+t=m1;

calculating S/T, and eliminating data equal to 1 in S/T to obtain first sample data;

calculating a first proportion of sample data within an interval from u−p to u+q in the first sample data, wherein u is an expected average value, and p and q are preset sample parameters; and in a case where the first proportion is less than a set proportion, adjusting the collection parameter of the image acquisition apparatus according to the first proportion and using the image acquisition apparatus subjected to parameter adjustment to re-collect first test image data until the re-calculated first proportion is greater than or equal to the set proportion.

13. The electronic device according to claim 12, wherein before the image acquisition apparatus is used to acquire the m1 groups of first test image data in the set display region of the display panel displaying in the preset grayscale, the method further comprises:

using the image acquisition apparatus to acquire m2 groups of first test image data in the set display region of the display panel displaying in the preset grayscale, wherein m2 is greater than m1, and m2 is a natural number;

averaging a groups of second test image data of each light-emitting sub-pixel to obtain a third test data set A, wherein the third test data set A comprises n elements which are a1 to an, and averaging b groups of second test image data of each light-emitting sub-pixel to obtain a fourth test data set B, wherein the fourth test data set B comprises n elements which are b1 to bn, wherein a1 to an are average values of a groups of brightness data of the n different light-emitting sub-pixels respectively; b1 to bn are average values of b groups of brightness data of the n different light-emitting sub-pixels; and a+b=m2;

calculating A/B, and eliminating data equal to 1 in A/B to obtain second sample data; and determining u, p, and q according to the second sample data.

14. The electronic device according to claim 13, wherein the method further comprises:

averaging m1 groups of first test image data of each light-emitting sub-pixel to obtain a fifth test data set E, wherein the fifth test data set E comprises n elements which are e1 to en, wherein e1 to en are average values of m1 groups of brightness data of the n different light-emitting sub-pixels respectively; and calculating S/E and T/E, and supplementing data obtained by eliminating data equal to 1 in S/E and T/E to the first sample data.

15. The electronic device according to claim 13, wherein the method further comprises:

averaging m2 groups of second test image data of each light-emitting sub-pixel to obtain a sixth test data set C, wherein the sixth test data set C comprises n elements which are c1 to cn, wherein c1 to cn are average values of m2 groups of brightness data of the n different light-emitting sub-pixels respectively; and calculating A/C and B/C, and supplementing data obtained by eliminating data equal to 1 in A/C and B/C to the second sample data.

16. The electronic device according to claim 10, wherein using the image acquisition apparatus to acquire the m1 groups of first test image data in the set display region of the display panel displaying in the preset grayscale comprises:

using the image acquisition apparatus to acquire m1 groups of first test image data in a secondary screen region of the display panel displaying in the preset grayscale, wherein the display panel comprises a primary screen region and the secondary screen region.

17. The electronic device according to claim 16, wherein a pixel density of the secondary screen region is less than a pixel density of the primary screen region.

18. A compensation method of a display panel, comprising:

using a method for adjusting an image acquisition apparatus to adjust a collection parameter of the image acquisition apparatus;

using the image acquisition apparatus subjected to parameter adjustment to collect test image data in a plurality of different preset grayscales; and determining a compensation value of the display panel according to the test image data in the plurality of different preset grayscales and target brightness, wherein the method for adjusting the image acquisition apparatus, comprising:

using the image acquisition apparatus to acquire m1 groups of first test image data in a set display region of a display panel displaying in a preset grayscale, wherein m1 is a natural number greater than 2;

determining a collection parameter of the image acquisition apparatus according to data deviation distribution of the m1 groups of first test image data; and configuring the determined collection parameter of the image acquisition apparatus into the image acquisition apparatus.

19. The method according to claim 18, wherein using the image acquisition apparatus subjected to the parameter adjustment to collect the test image data in the plurality of different preset grayscales comprises:

using the image acquisition apparatus subjected to the parameter adjustment to collect f groups of test image data, wherein f is less than m1; and wherein determining the compensation value of the display panel according to the test image data in the plurality of different preset grayscales and the target brightness comprises:

obtaining an average value of the f groups of test image data, and obtaining a compensation value of each sub-pixel in the display panel according to the average value and the target brightness.

20. The method according to claim 19, wherein f is 2 or 3.

* * * * *